US012379280B2

(12) United States Patent
Fu et al.

(10) Patent No.: US 12,379,280 B2
(45) Date of Patent: Aug. 5, 2025

(54) METHOD OF MEASURING EFFICIENCY FOR OPTICAL DEVICES

(71) Applicant: Applied Materials, Inc., Santa Clara, CA (US)

(72) Inventors: Jinxin Fu, Fremont, CA (US); Yangyang Sun, San Jose, CA (US); Kazuya Daito, Milpitas, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 506 days.

(21) Appl. No.: 17/653,785

(22) Filed: Mar. 7, 2022

(65) Prior Publication Data
US 2022/0291082 A1    Sep. 15, 2022

Related U.S. Application Data

(60) Provisional application No. 63/161,346, filed on Mar. 15, 2021.

(51) Int. Cl.
| | |
|---|---|
| *G01M 11/02* | (2006.01) |
| *G01S 7/481* | (2006.01) |
| *G01S 17/89* | (2020.01) |

(52) U.S. Cl.
CPC ......... *G01M 11/0207* (2013.01); *G01S 7/481* (2013.01); *G01S 17/89* (2013.01)

(58) Field of Classification Search
CPC .... G01M 11/0207; G01S 7/481; G01S 17/89; G01S 7/4811; G01S 7/497;
(Continued)

(56) References Cited

U.S. PATENT DOCUMENTS

| | | |
|---|---|---|
| 2008/0285026 A1 | 11/2008 | Okawauchi et al. |
| 2009/0059215 A1 | 3/2009 | Mehanian et al. |

(Continued)

FOREIGN PATENT DOCUMENTS

| | | | | |
|---|---|---|---|---|
| CN | 202100980 | * | 1/2021 | ............. G01N 21/21 |
| JP | H01138623 | * | 5/1989 | ............... G02B 7/28 |

(Continued)

OTHER PUBLICATIONS

International Search Report and Written Opinion for International Application No. PCT/US2022/019162 dated Jun. 23, 2022.
(Continued)

*Primary Examiner* — Md M Rahman
(74) *Attorney, Agent, or Firm* — Patterson + Sheridan, LLP (57) ABSTRACT

Embodiments of the present disclosure relate to measurement systems and methods of measuring efficiency of optical devices. In one example, the measurement systems include a light source, a mirror, an illumination source, and a sensor. The light source provides a light beam to the optical device to be diffracted into diffraction beams having diffraction orders. The diffractions beams form a diffraction pattern. The method includes positioning the optical device in the measurement system and directing the diffraction beams to the sensor. The sensor is operable to measure the efficiency of the optical device by measuring the diffraction pattern.

7 Claims, 7 Drawing Sheets

(58) Field of Classification Search
CPC ... G01N 2021/9511; G01N 2021/9583; G01N 21/958
USPC .......................................................... 356/124
See application file for complete search history.

(56) References Cited

U.S. PATENT DOCUMENTS

| | | | | |
|---|---|---|---|---|
| 2013/0208256 | A1* | 8/2013 | Mamidipudi | G01S 7/4815 359/15 |
| 2015/0226677 | A1* | 8/2015 | Sullivan | G02B 21/002 356/237.5 |
| 2016/0258878 | A1* | 9/2016 | Zhang | G02B 13/143 |
| 2017/0184483 | A1* | 6/2017 | Bartels | G01N 15/1468 |

FOREIGN PATENT DOCUMENTS

| | | |
|---|---|---|
| JP | 09196813 A | 7/1997 |
| JP | H9196813 A | 7/1997 |
| JP | 2008286583 A | 11/2008 |
| WO | 2006107929 A1 | 10/2006 |
| WO | 2021040936 A1 | 3/2021 |

OTHER PUBLICATIONS

Sudheer, Kumar, Diffraction Efficiency of Plasmonic Gratings Fabricated by Electron Beam Lithography Using a Silver Halide Film, Journal of Applied Physics, Jul. 22, 2016, vol. 120, No. 4, pp. 043101(1)-043101(8).

Sudheer K. et al., "Diffraction efficiency of plasmonic gratings fabricated by electron beam lithography using a silver halide film." Journal of Applied Physics, vol. 120, 043101, 2016, pp. 043101-1 to 043101-8, doi: 10.1063/1.4956438.

Japanese Office Action dated Dec. 10, 2024 for Application No. 2023-571440.

Office Action dtd Jun. 10, 2025 for Japanese Patent Application No. 2023-571440.

* cited by examiner

METHOD OF MEASURING EFFICIENCY FOR OPTICAL DEVICES

CROSS-REFERENCE TO RELATED APPLICATIONS

This application claims benefit of U.S. Provisional Patent Application No. 63/161,346, filed Mar. 15, 2021, which is herein incorporated by reference in its entirety.

BACKGROUND

Field

Embodiments of the present disclosure generally relate to optical devices. More specifically, embodiments of the present disclosure relate to measurement systems and methods of measuring diffraction efficiency of optical devices.

Description of the Related Art

Optical devices including waveguide combiners and flat optical devices, such as metasurfaces and flat lenses, are used in various sensing applications (e.g., facial identification sensors). Generated light is propagated through the optical device until the light exits the optical device with a diffraction pattern. It is beneficial to improve the diffraction efficiency of the optical devices as well as to obtain a uniform distribution across a field of view of the optical devices. Additionally, it is beneficial to measure the diffraction orders of the diffraction pattern with a large numerical aperture. However, it is difficult to measure the efficiency of all of the diffraction orders simultaneously.

Therefore, what is needed in the art are measurement systems and methods of measuring diffraction efficiency of optical devices.

SUMMARY

In one embodiment, a measurement system is provided. The measurement system includes a light source configured to project a light beam, an objective lens disposed in the light beam. The light beam includes diffraction beams. The measurement system further includes a mirror operable to direct the diffraction beams from the objective lens through two or more relay lenses and a sensor disposed adjacent to the two or more relay lenses. The two or more relay lenses direct the diffraction beams having a diffraction pattern to the sensor. The measurement system further includes an illumination source disposed opposite of the light source.

In another embodiment, a measurement system is provided. The measurement system includes a light source configured to project a light beam, the light beam includes diffraction beams. The measurement system further includes an illumination source configured to provide white light and a sensor disposed opposite of the light source and the illumination source. The measurement system further includes a mirror operable to direct the diffraction beams having a diffraction pattern to the sensor.

In yet another embodiment, a method is provided. The method includes positioning an optical device in a measurement system. The method further includes aligning the optical device with a light source by capturing fiducial marks on the optical device. The method further includes directing a light beam from a light source to the optical device. The optical device diffracts the light beam into diffraction beams. The method further includes directing the diffraction beams through an objective lens, directing the diffraction beams to a sensor with a mirror and one or more relay lenses and measuring a diffraction efficiency of a diffraction pattern formed by the diffraction beams with the sensor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to measurement systems and methods of measuring diffraction efficiency of optical devices.

Figure 1A:
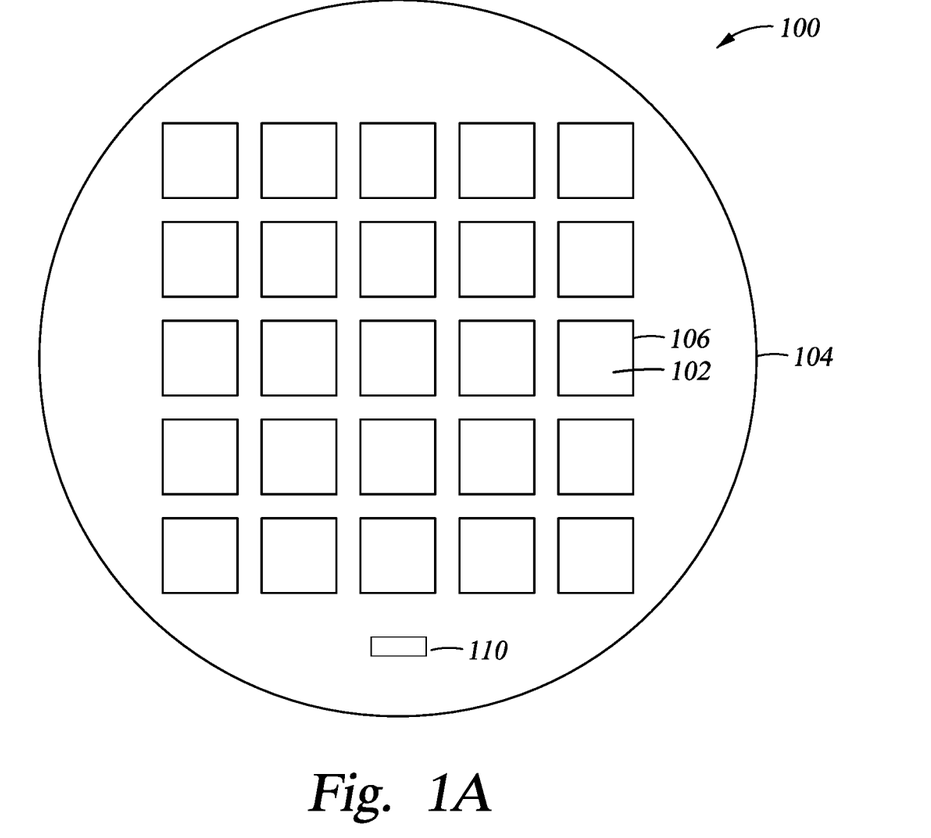
FIG. 1A is a schematic, top view of an optical device according to embodiments.
Figure 1B:
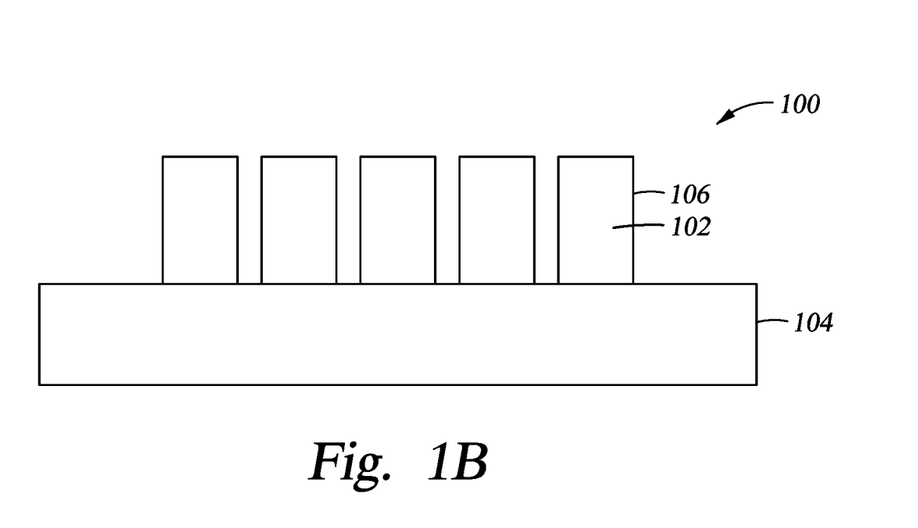
FIG. 1B is a schematic, side view of an optical device according to embodiments.

FIG. 1A is a schematic, top view of an optical device 100 according to embodiments. FIG. 1B is a schematic, side view of an optical device 100, according to embodiments. The optical device 100 may be any optical device operable to be utilized in sensing applications (e.g., facial identification sensors). For example, the optical device 100 may be a waveguide combiner or a flat optical device, such as a metasurface or a flat lens.

The optical device 100 includes a plurality of optical device structures 102 disposed on a substrate 104. The optical device structures 102 may be nanostructures having sub-micron dimensions, e.g., nano-sized dimensions. While FIGS. 1A and 1B depict the optical device structures 102 as having square or rectangular shaped cross-sections, the cross-sections of the optical device structures 102 may have other shapes including, but not limited to, circular, triangular, elliptical, regular polygonal, irregular polygonal, and/or irregular shaped cross-sections. Although only twenty five optical device structures 102 are shown on the substrate 104, any number of optical device structures 102 may be disposed on the substrate 104. In some embodiments, the optical device structures 102 may be angled, with at least one sidewall 106 of the plurality of optical device structures 102 angled relative to the substrate 104. The optical device 100 includes fiducial marks 110 disposed on the substrate 104.

The substrate 104 can be any used in the art, and can be either opaque or transparent depending on the use of the substrate 104. The substrate 104 includes any suitable material, provided that the substrate 104 can adequately transmit light in a predetermined wavelength or wavelength range and can serve as an adequate support for the plurality of optical device structures 102. The substrate 104 includes, but is not limited to, amorphous dielectrics crystalline dielectrics, silica (e.g., fused silica), magnesium oxide, polymers, silicon (Si), silicon dioxide ($SiO_2$), quartz, silicon carbide (SiC), germanium (Ge), silicon germanium (SiGe), indium phosphide (InP), gallium arsenide (GaAs), gallium nitride (GaN), sapphire, or combinations thereof. In some embodiments, which can be combined with other embodiments described herein, the substrate 104 includes a transparent material. Suitable examples may include an oxide, sulfide, phosphide, telluride, or combinations thereof. The substrate 104 can be any size or shape, such as, but not limited to, 150 mm, 200 mm, or 300 mm diameter wafers.

Figure 2:
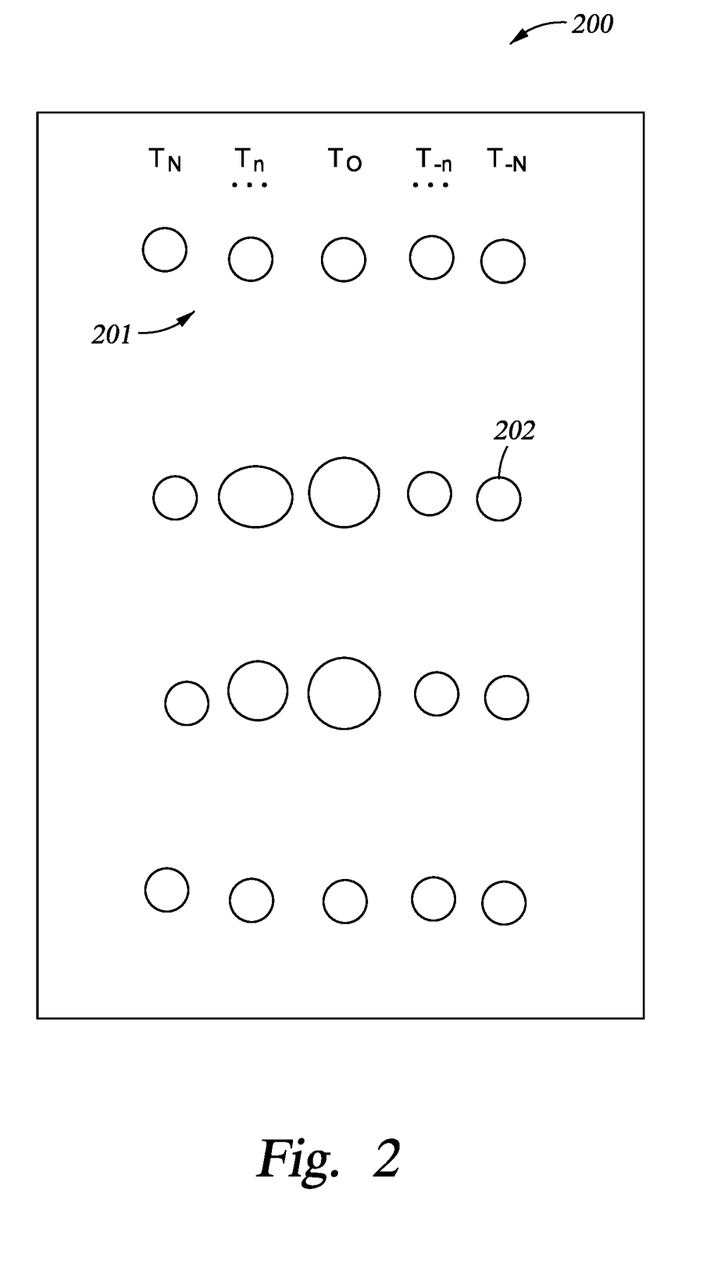
FIG. 2 is a schematic, top view of a diffraction pattern according to embodiments.

FIG. 2 is a schematic, top view of a diffraction pattern 200 according to embodiments. The diffraction pattern 200 is produced when a light beam is diffracted by an optical device 100. The diffraction pattern 200 includes diffraction beams 201 which form the diffraction pattern 200. The diffraction beams 201 include one or more diffraction orders n with a highest order N and a negative highest order −N. As shown in FIG. 2, a highest order N ($T_N$) beam is diffracted and a negative highest order −N ($T_{-N}$) beam is diffracted. When the light beam is incident on the optical device 100, the light is diffracted from the optical device structures 102 in directions corresponding to diffraction orders n, where n=−2, −1, 0, 1, 2, 3, etc. The zero-order mode ($T_0$) beam is also diffracted. The diffraction beams 201 do not have an upper limit on the highest order N and the negative highest order −N.

The diffraction beams 201 produce a plurality of light spots 202 in the diffraction pattern 200. The plurality of light spots 202 each have a light spot intensity. The light spot intensity of each light spot 202 may be compared to the other light spots 202, to determine the uniformity of the light spot intensity of the diffraction pattern 200. Additionally, the light spot intensity of each light spot 202 may be compared with the total light emitted from a light source to determine a diffraction efficiency of the diffraction orders n of the diffraction beams 201. The light spot intensity is the total power of the light spot 202. The diffraction efficiency is a measure of how much optical power is diffracted into a designated direction compared to the power incident onto the optical device 100. In some embodiments, each of the light spots 202 have the same size but different light spot intensities.

Figure 3A:
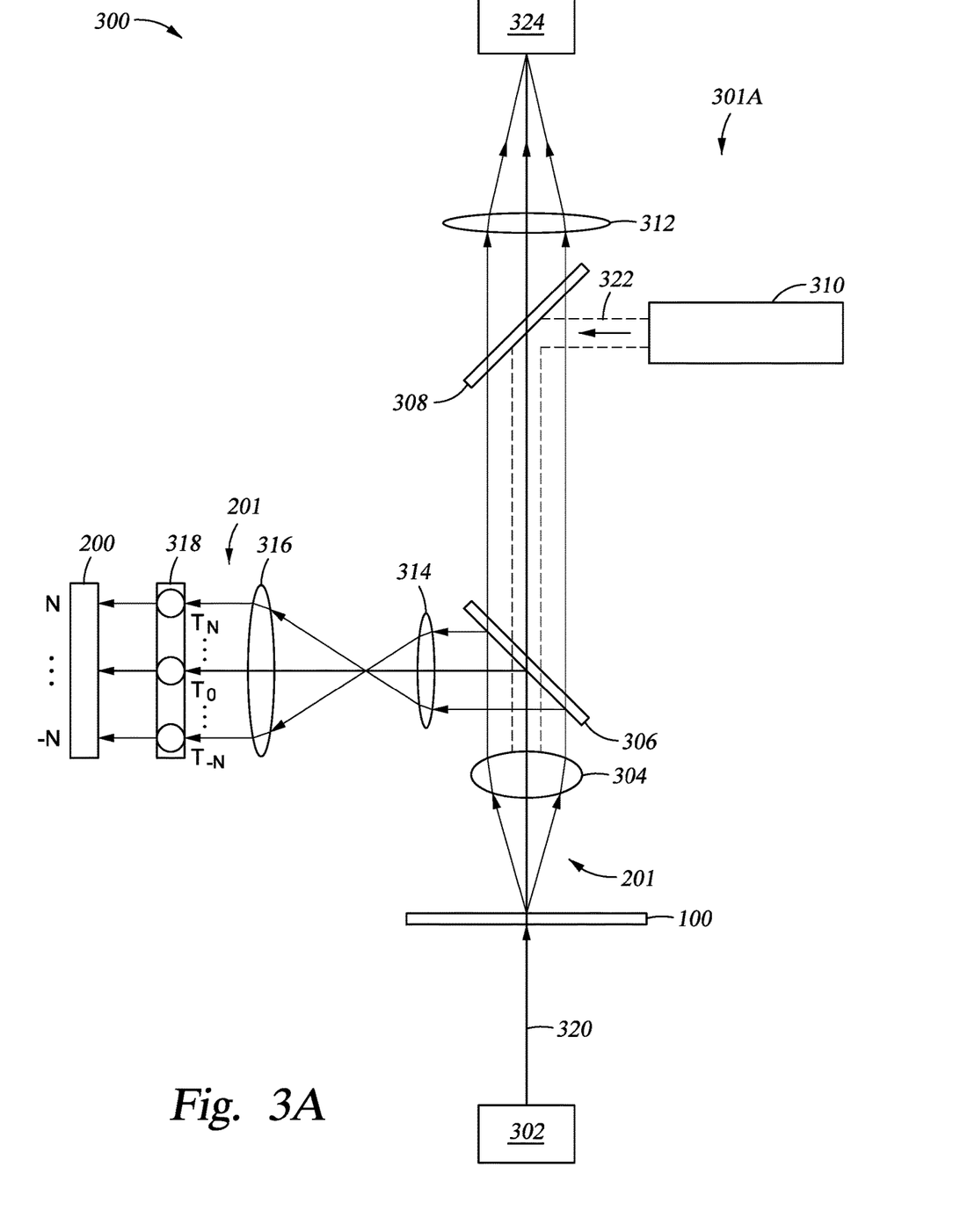
FIG. 3A is a schematic, cross-sectional view of a configuration of a measurement system according to embodiments.

FIG. 3A is a schematic, cross-sectional view of a configuration 301A of a measurement system 300 according to embodiments. The measurement system 300 may be used for methods of measuring diffraction efficiency of optical devices described herein. The measurement system 300 enables both real space imaging (microscopy) and k-space (angular space/back focal plane) imaging. Therefore, the diffraction efficiency (k space) can be measured and the device can be inspected simultaneously. The measurement system 300 includes a light source 302, an objective lens 304, a first mirror 306, a second mirror 308, an illumination source 310, a tube lens 312, a first relay lens 314, a second relay lens 316, and a sensor 318. The measurement system 300 images the diffraction pattern 200 at the back focal plane of an objective lens. The back focal plane is between the objective lens 304 and the first mirror 306. The back focal plane is relayed to the sensor 318 through the first relay lens 314 and the second relay lens 316. One or more optical devices 100 are disposed between the objective lens 304 and the light source 302. In one embodiment, which can be combined with other embodiments described herein, multiple optical devices 100 may be disposed between the objective lens 304 and the light source 302. For example, multiple optical devices 100 may be disposed on a translation stage to be measured by the measurement system 300. In another embodiment, which can be combined with other embodiments described herein, only the optical device 100 is disposed between the objective lens 304 and the light source 302.

The light source 302 is configured to direct a light beam 320 to one of the optical devices 100. As shown in FIG. 3A, the light beam 320 passes through the optical device 100 and is diffracted to the objective lens 304. The objective lens 304 is disposed between the optical devices 100 and the first mirror 306. In some embodiments, which can be combined with other embodiments described herein, the light beam 320 is directed to the optical device 100 and the light beam 320 propagates through the optical device 100 prior to being diffracted to the objective lens 304. For example, in embodiments where the optical device 100 is a waveguide, the light beam 320 may propagate through the optical device 100. The light beam 320 is diffracted into diffraction beams 201 and directed to the objective lens 304. The objective lens 304 may have a numerical aperture (NA) between about 0.5 and about 1.0. The objective lens 304 may have a magnification power of between about 20× and about 60×.

The illumination source 310 is configured to direct white light 322 to the second mirror 308. The illumination source 310 is disposed opposite the light source 302. The second mirror 308 may be a dichroic mirror. The white light 322 is reflected by the second mirror 308 to the objective lens 304. A dichroic mirror is a mirror with different reflection or transmission properties depending on the wavelength of the incident light. As such, the diffraction beams 201 may be directed to the tube lens 312 by transmitting through the second mirror 308. The tube lens 312 directs the diffraction beams 201 to create a real image 324. The real image 324 and the white light 322 directed to the objective lens 304 are utilized to position the optical device 100 in the measurement system 300. For example, the optical device 100 may be aligned such that desired portions of the optical device 100 to be measured are positioned in the measurement system 300. In some embodiments, alignment cameras (not shown) capture fiducial marks 110 on the optical device 100. The relative position of the fiducial marks 110 on the optical device 100 are known and the design of the optical device 100 is known. Therefore, a scan map for each optical device 100 to be measure can be built. As such, the optical device 100 can be positioned in alignment with the light source 302.

The diffraction beams 201 are further directed to the first mirror 306. The first mirror 306 may be a dichroic mirror. The first mirror 306 is disposed between the second mirror 308 and the objective lens 304. The first mirror 306 reflects the diffraction beams 201 from the objective lens 304 to the first relay lens 314 and the second relay lens 316. The diffraction beams 201 may also be transmitted through the first mirror 306 to second mirror 308. The first relay lens 314 is disposed between the first mirror 306 and the second relay lens 316. The second relay lens 316 is disposed between the first relay lens 314 and the sensor 318. The sensor 318 has a surface area between about 70 mm² and about 864 mm². The second relay lens 316 directs the diffraction beams 201 to the sensor 318. The diffraction beams 201 form a diffraction pattern 200 on the sensor 318. The sensor 318 may be a 2D LIDAR sensor. The diffraction pattern 200 includes the diffraction beams 201 with one or more diffraction orders n with a highest order N and a negative highest order –N. As shown in FIG. 3, a highest order N ($T_N$) beam is diffracted and a negative highest order –N ($T_{-N}$) beam is diffracted. A zero-order mode ($T_0$) beam is also diffracted.

Figure 3B:
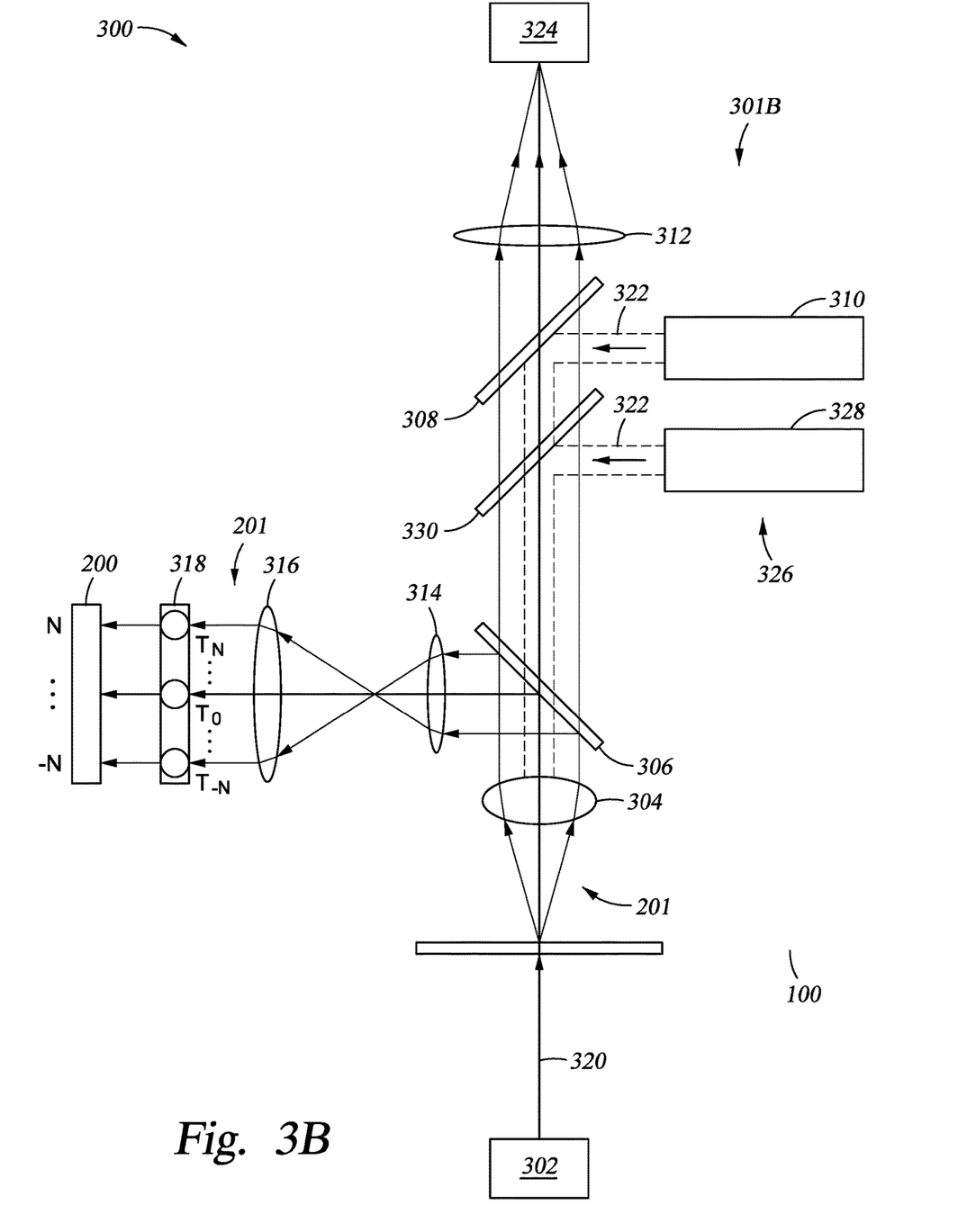
FIG. 3B is a schematic, cross-sectional view of a configuration of a measurement system according to embodiments.

FIG. 3B is a schematic, cross-sectional view of a configuration 301B of a measurement system 300. The measurement system 300 may be used for methods of measuring diffraction efficiency of optical devices described herein. The measurement system 300 includes a light source 302, an objective lens 304, a first mirror 306, a second mirror 308, an illumination source 310, a tube lens 312, a first relay lens 314, a second relay lens 316, and a sensor 318. One or more optical devices 100 are disposed between the objective lens 304 and the light source 302. The diffraction efficiency is obtained by directly mounting the sensor 318 after the optical devices 100. In one embodiment, which can be combined with other embodiments described herein, multiple optical devices 100 may be disposed between the objective lens 304 and the light source 302. For example, multiple optical devices 100 may be disposed on a translation stage to be measured by the measurement system 300. In another embodiment, which can be combined with other embodiments described herein, only the optical device 100 is disposed between the objective lens 304 and the light source 302.

The configuration 301B is utilized to control the gap between one or more optical devices 100 and the objective lens 304. The configuration 301B includes the measurement system 300 described with reference to FIG. 3A and an autofocus system 326. The autofocus system 326 includes an autofocus module 328 and a third mirror 330. The autofocus system 326 compensates for sagging and bowing of the substrate 104. Due to the distance between the objective lens 304 and the optical device 100 varying from sag and bowing, the autofocus system 326 will compensate for the varying distance.

Figure 4:
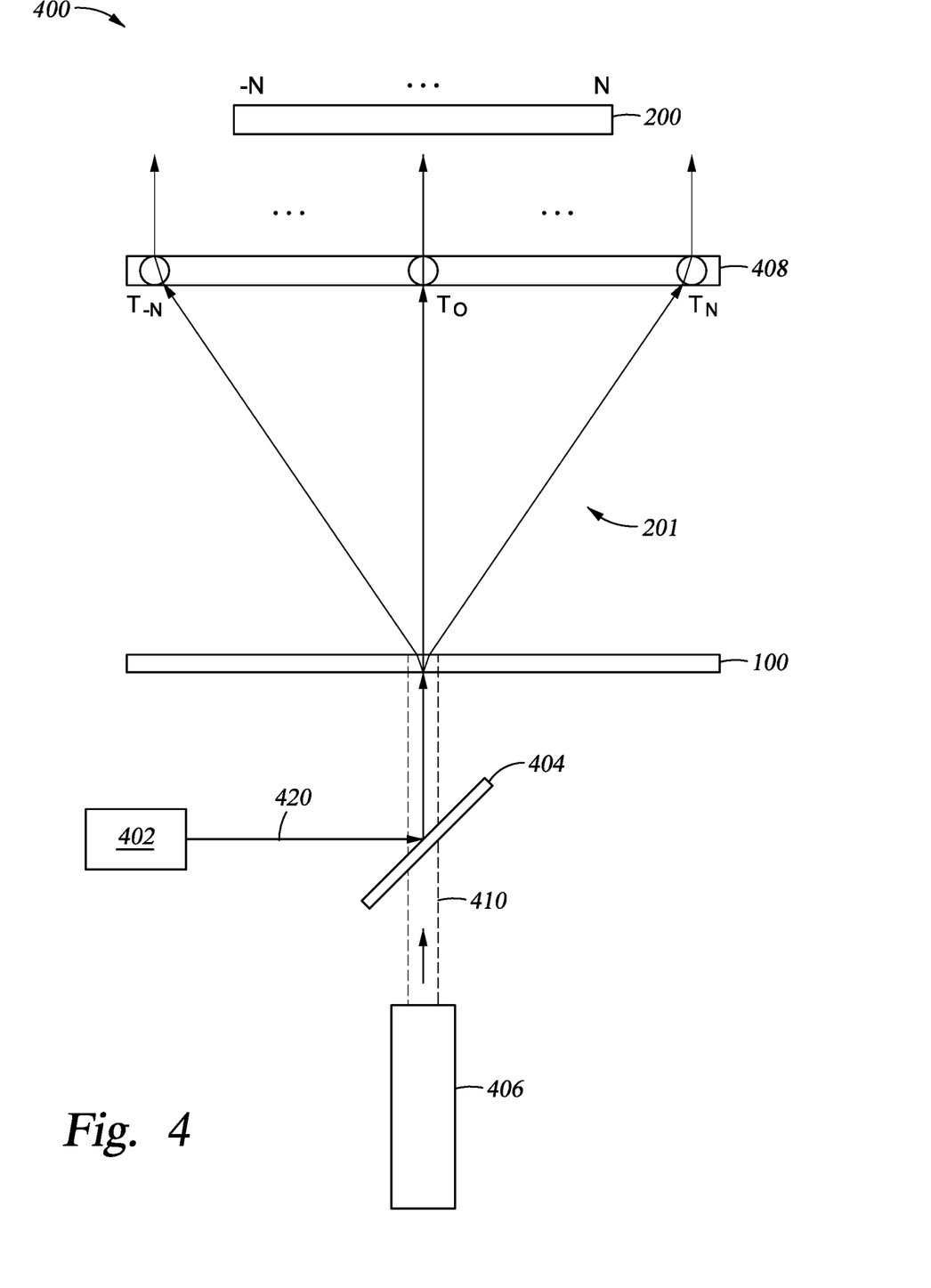
FIG. 4 is a schematic, cross-sectional view of a of a measurement system according to embodiments.

FIG. 4 is a schematic, cross-sectional view of a of a measurement system 400 according to embodiments. The measurement system 400 may be used for methods of measuring diffraction efficiency of optical devices described herein. The measurement system 400 includes a light source 402, a mirror 404, an illumination source 406, and a sensor 408. One or more optical devices 100 are disposed between the light source 402 and the sensor 408. In one embodiment, which can be combined with other embodiments described herein, multiple optical devices 100 may be disposed between the light source 402 and the sensor 408. For example, multiple optical devices 100 may be disposed on a translation stage to be measured by the measurement system 400. In another embodiment, which can be combined with other embodiments described herein, only the optical device 100 is disposed between the light source 402 and the sensor 408. The sensor 408 includes a surface area of between about 70 mm² and about 864 mm². The sensor 408 is disposed opposite of the light source 402 and the illumination source 406.

The light source 402 is configured to direct a light beam 420 to one of the optical devices 100. As shown in FIG. 4, the light beam 420 is directed to the mirror 404. The mirror 404 reflects the light beam 420 to pass through the optical device 100. The light beam 420 is diffracted to the sensor 408. In some embodiments, which can be combined with other embodiments described herein, the light beam 420 is directed to the optical device 100 and the light beam 420 propagates through the optical device 100 prior to being diffracted to the sensor 408. For example, in embodiments where the optical device 100 is a waveguide, the light beam 420 may propagate through the optical device 100. The light beam 420 is diffracted into diffraction beams 201 and directed to the sensor 408. The sensor 408 may have a numerical aperture (NA) between about 0.85 and about 1.0. The sensor 408 may be a 20 mm sensor.

The illumination source 406 is configured to direct white light 410 to the light beam 420 as the light beam 420 contacts the optical device 100. The white light 410 is utilized to position the optical device 100 in the measurement system 400. For example, the optical device 100 may be aligned such that desired portions of the optical device 100 to be measured are positioned in the measurement system 400. Fiducial marks 110 on the optical device 100 are utilized to align the optical device 100 within the measurement system 300.

The diffraction beams 201 are directed to the sensor 408. The diffraction beams 201 form a diffraction pattern 200 on the sensor 408. The sensor 408 may be a 2D LIDAR sensor. The diffraction pattern 200 includes the diffraction beams 201 with one or more diffraction orders n with a highest order N and a negative highest order –N. As shown in FIG. 3, a highest order N ($T_N$) beam is diffracted and a negative highest order –N ($T_{-N}$) beam is diffracted. A zero-order mode ($T_0$) beam is also diffracted.

The diffraction beams 201 produce a plurality of light spots 202 in the diffraction pattern 200. The sensor 408 is operable to measure a light spot intensity of each light spot 202. The light spot intensity may be compared to the other light spots 202, to determine the uniformity of the light spot intensity of the diffraction pattern 200. Additionally, the light spot intensity of each light spot 202 may be compared with the total light from the light source 402 to determine an efficiency of the diffraction orders n of the diffraction beams 201. In some embodiments, the uniformity and intensity of the light spots 202 may be compared to light spots 202 of other optical devices 100.

Figure 5:
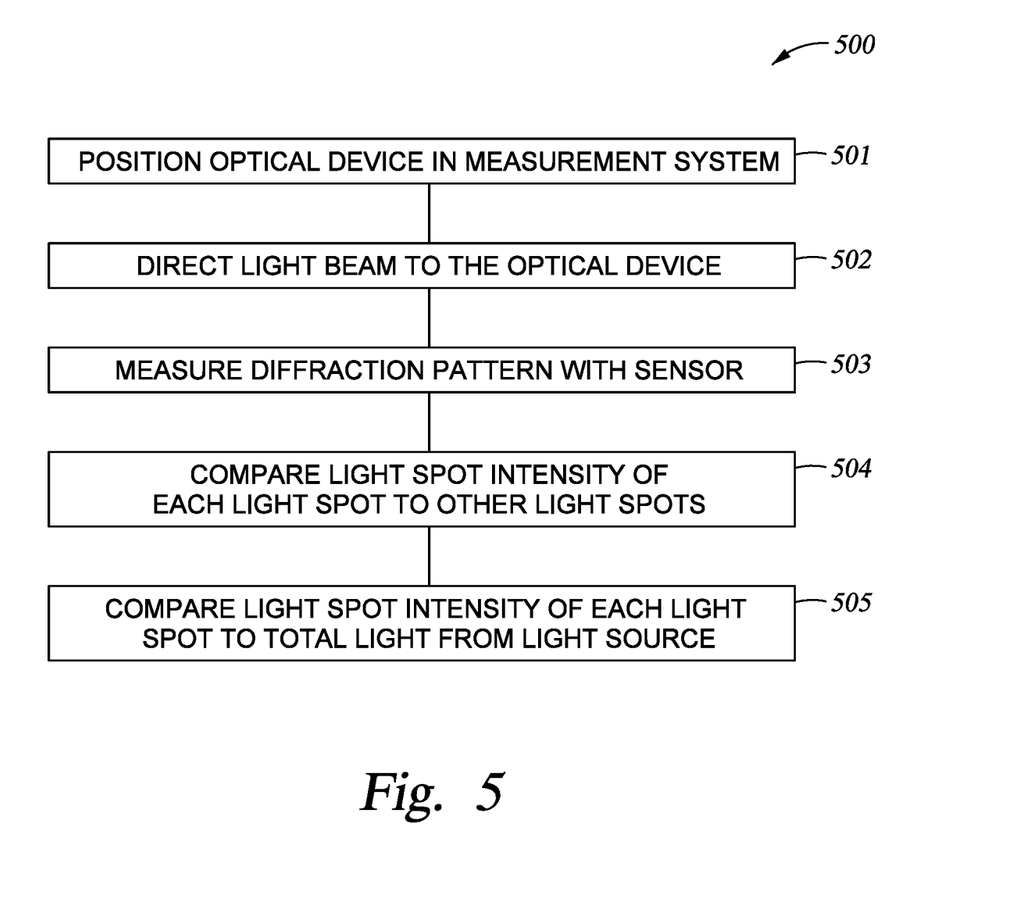
FIG. 5 is a flow diagram of a method of measuring diffraction efficiency of one or more optical devices with a measurement system according to embodiments.

FIG. 5 is a flow diagram of a method 500 of measuring diffraction efficiency of one or more optical devices 100 with a measurement system 300. The measurement system 300 described herein allows for a numerical aperture near 1 to be achieved. By controlling the distance between the optical device 100 and the sensor 318, and having a large surface area of the sensor 318, the numerical aperture may be near 1. The numerical aperture is achieved by utilizing microscope objectives. Additionally, the diffraction orders may be measured in parallel for all diffraction orders to increase throughput. To facilitate explanation, the method will be described with reference to a configuration 301A of the measurement system 300, but it is to be understood that a configuration 301B may be utilized in conjunction with the method provided herein.

At operation 501, an optical device 100 is positioned within the measurement system 300. For example, the portions of the optical device 100 to be measured are positioned within the measurement system 300. The real image 324 and the white light 322 are utilized to position the optical device 100 in the measurement system 300. The optical device 100 is aligned with a light source 302. The optical device 100 is aligned by capturing fiducial marks 110 on the optical device 100. The white light 322 illuminates the fiducial marks 110. Once the fiducial marks are located, the optical device 100 can be positioned in alignment with the light source 302 based on the relative positons of the fiducial marks 110. Further, the distance variation between the optical device 100 and an objective lens 304 of the measurement system 300 is measured. In embodiments where the measurement system 300 includes an autofocus system 326, the autofocus system 326 is utilized to compensate for bowing and sagging of the optical device 100. The autofocus system 326 allows for the optical device 100 to be in focus in the measurement system 300.

At operation 502, a light beam 320 is directed to the optical device 100. The optical device 100 diffracts the light into diffraction beams 201. The diffraction beams 201 are directed to an objective lens 304. The diffraction beams 201 are then directed to a sensor 318 by a first mirror 306, a first relay lens 314, and a second relay lens 316.

At operation 503, the diffraction beams 201 forming a diffraction pattern 200 are measured by the sensor 318. The diffraction beams 201 produce a plurality of light spots 202 (shown in FIG. 2) in the diffraction pattern 200. The sensor 318 measures a light spot intensity of each light spot 202 (shown in FIG. 2).

At operation 504, the light spot intensity of each light spot 202 is compared to the other light spots 202. The comparing allows for the determination of the uniformity of the light spot intensity of the diffraction pattern 200. Additionally, at operation 505, the light spot intensity of each light spot 202 (shown in FIG. 2) may be compared with the total light from the light source 302 to determine a diffraction efficiency of the diffraction orders n of the diffraction beams 201. In some embodiments, the uniformity and intensity of the light spots 202 (shown in FIG. 2) may be compared to light spots 202 of other optical devices 100.

Figure 6:
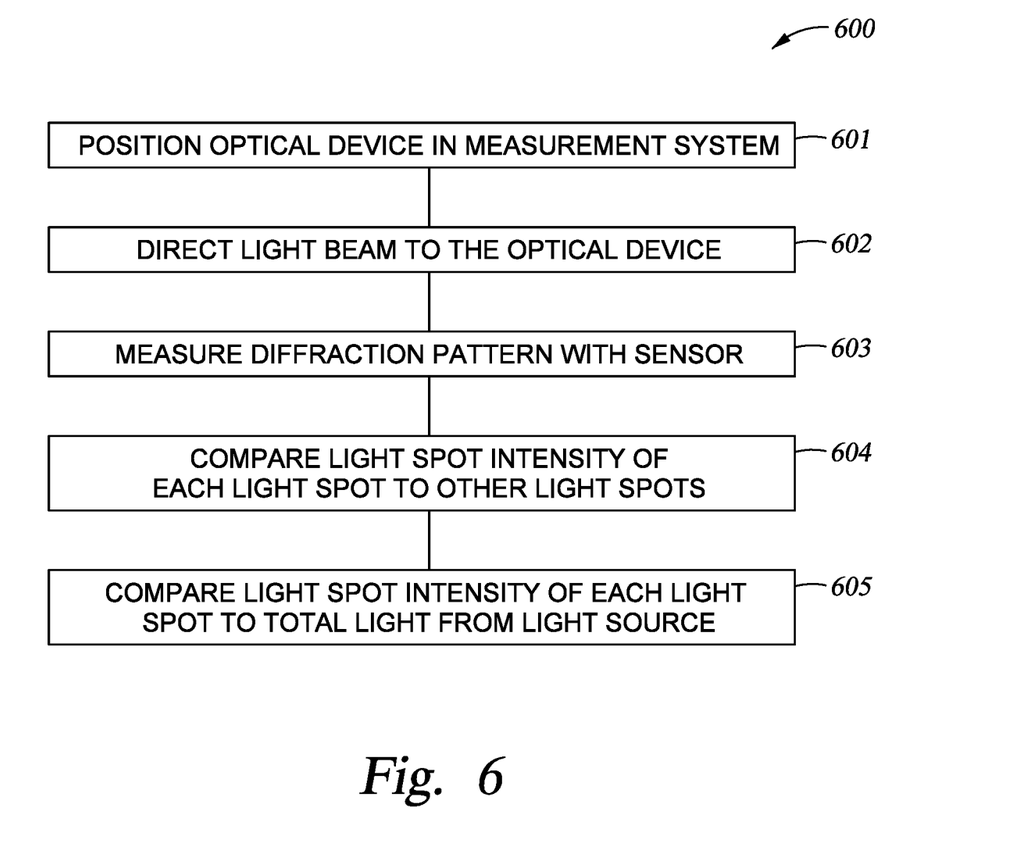
FIG. 6 is a flow diagram of a method of measuring diffraction efficiency of one or more optical devices with a measurement system according to embodiments.

FIG. 6 is a flow diagram of a method 600 of measuring diffraction efficiency of one or more optical devices 100 with a measurement system 400. The measurement system 400 described herein allows for a numerical aperture near 1 to be achieved. By controlling the distance between the optical device 100 and the sensor 408, and having a large surface area of the sensor 408, the numerical aperture may be near 1. Additionally, the diffraction orders may be measured in parallel for all diffraction orders to increase throughput.

At operation 601, an optical device 100 is positioned within the measurement system 400. For example, the portions of the optical device 100 to be measured are positioned within the measurement system 400. The white light 410 is utilized to position the optical device 100 in the measurement system 400. The optical device 100 is aligned with a light source 402. The optical device 100 is aligned by capturing fiducial marks 110 on the optical device 100. The illumination source 406 illuminates the fiducial marks 110 to be captured. Once the fiducial marks 110 are located, the optical device 100 can be positioned in alignment with the light source 402 based on the relative positons of the fiducial marks 110.

At operation 602, a light beam 420 is directed to the optical device 100. The light beam 420 may be directed to the optical device 100 by a mirror 404. The optical device 100 diffracts the light into diffraction beams 201. The diffraction beams 201 are directed to a sensor 408.

At operation 603, the diffraction beams 201 forming a diffraction pattern 200 are measured by the sensor 408. The diffraction beams 201 produce a plurality of light spots 202 in the diffraction pattern 200. The sensor 408 measures a light spot intensity of each light spot 202.

At operation 604, the light spot intensity is compared to the other light spots 202. The comparing allows the determination of the uniformity of the light spot intensity of the diffraction pattern 200. Additionally, at operation 605, the light spot intensity of each light spot 202 may be compared with the total light from the light source 402 to determine a diffraction efficiency of the diffraction orders n of the diffraction beams 201. In some embodiments, the uniformity and intensity of the light spots 202 may be compared to light spots 202 of other optical devices 100.

In summation, measurement systems and methods of measuring efficiency of optical devices are described herein. The measurement systems, in one example, include at least a light source, a mirror, an illumination source, and a sensor. The light source provides a light beam to the optical device to be diffracted into diffraction beams having diffraction orders. The diffractions beams form a diffraction pattern. The method includes positioning the optical device in the measurement system and directing the diffraction beams to the sensor. The sensor is operable to measure the efficiency of the optical device by measuring the diffraction pattern. Additionally, the uniformity of the diffraction pattern may be measured by the sensor. The embodiments described herein allow for a numerical aperture near 1 to be achieved. The sensor is operable to measure the efficiency of the diffraction orders simultaneously, thus improving throughput. The measurement systems may be easily integrated into production lines to minor the diffraction efficiency and uniformity.

While the foregoing is directed to embodiments of the present disclosure, other and further embodiments of the disclosure may be devised without departing from the basic scope thereof, and the scope thereof is determined by the claims that follow.

What is claimed is:

1. A measurement system, comprising:
a light source configured to project a light beam;
an objective lens disposed in the light beam, the light beam including diffraction beams;
a first mirror operable to reflect the diffraction beams from the objective lens through two or more relay lenses;
a sensor disposed adjacent to the two or more relay lenses, wherein the two or more relay lenses are positioned to direct the diffraction beams having a diffraction pattern to the sensor; and
an illumination source disposed opposite of the light source, the illumination source configured to project white light toward a second mirror, the second mirror positioned to reflect the white light toward the objective lens.

2. The measurement system of claim 1, further comprising a tube lens configured to direct the diffraction beams to form a real image.

3. The measurement system of claim 1, wherein an optical device is configured to be disposed between the light source and the objective lens, wherein the light beam is operable to propagate through the optical device and the light beam is operable to be diffracted by the optical device.

4. The measurement system of claim 1, wherein the first mirror is a dichroic mirror.

5. The measurement system of claim 1, wherein the sensor is a 2D LIDAR sensor.

6. The measurement system of claim 1, wherein the objective lens has a numerical aperture (NA) between about 0.5 and about 1.0.

7. The measurement system of claim 1, wherein the diffraction beams produce a plurality of light spots in the diffraction pattern, wherein the sensor is operable to measure a light spot intensity of each light spot.

* * * * *